(12) United States Patent
Peruzzo

(10) Patent No.: US 9,145,181 B2
(45) Date of Patent: Sep. 29, 2015

(54) WALL-MOUNTED BICYCLE RACK

(71) Applicant: Martina Peruzzo, Rosa' (IT)

(72) Inventor: Martina Peruzzo, Rosa' (IT)

(*) Notice: Subject to any disclaimer, the term of this patent is extended or adjusted under 35 U.S.C. 154(b) by 0 days.

(21) Appl. No.: 14/448,153

(22) Filed: Jul. 31, 2014

(65) Prior Publication Data

US 2015/0034573 A1  Feb. 5, 2015

(30) Foreign Application Priority Data

Jul. 31, 2013 (IT) ................. B02013A0421

(51) Int. Cl.

| A47F 7/00 | (2006.01) |
|---|---|
| B62H 3/12 | (2006.01) |
| A47F 5/08 | (2006.01) |
| B62H 3/02 | (2006.01) |
| F16M 13/02 | (2006.01) |

(52) U.S. Cl.
CPC .. B62H 3/12 (2013.01); A47F 5/08 (2013.01); B62H 3/02 (2013.01); F16M 13/02 (2013.01)

(58) Field of Classification Search
USPC ............. 211/5, 7, 4, 17–19; 292/256, 256.71, 292/234.73; 269/3, 6, 95; 70/222, 223, 70/233–235; 224/548, 552, 553, 571, 924
See application file for complete search history.

(56) References Cited

U.S. PATENT DOCUMENTS

| 569,289 | A | * | 10/1896 | Lynch ............................. 211/17 |
|---|---|---|---|---|
| 580,032 | A | * | 4/1897 | Bierbach ........................ 211/17 |
| 585,910 | A | * | 7/1897 | Crisp ............................. 211/18 |
| 585,917 | A | * | 7/1897 | Lang .............................. 211/20 |
| 602,270 | A | * | 4/1898 | Sackett ........................... 211/17 |
| 611,401 | A | * | 9/1898 | White ............................. 70/234 |
| 614,503 | A | * | 11/1898 | Sackett ........................... 211/18 |
| 621,072 | A | * | 3/1899 | Gregory ........................... 211/5 |
| 661,677 | A | * | 11/1900 | Taylor ............................ 211/22 |
| 764,774 | A | * | 7/1904 | Sargeant ......................... 211/18 |
| 2,639,813 | A | * | 5/1953 | Risvold et al. ................. 211/19 |
| 3,357,663 | A | * | 12/1967 | Ivy ................................ 248/539 |
| 3,934,436 | A | * | 1/1976 | Candlin et al. .................. 70/234 |
| 3,947,010 | A | * | 3/1976 | Zeller ............................ 269/100 |
| 4,008,587 | A | * | 2/1977 | Frentzel et al. ................. 70/235 |
| 4,629,104 | A | * | 12/1986 | Jacquet ........................... 224/324 |
| 4,887,754 | A | * | 12/1989 | Boyer et al. ..................... 224/319 |
| 5,222,707 | A | * | 6/1993 | Myers ........................ 248/206.1 |
| 5,294,006 | A | * | 3/1994 | Deschino ......................... 211/18 |
| 5,385,280 | A | * | 1/1995 | Littlepage et al. ............. 224/521 |

(Continued)

FOREIGN PATENT DOCUMENTS

| DE | 20214018 U1 | 3/2003 |
|---|---|---|
| EP | 1440847 A1 | 7/2004 |

(Continued)

OTHER PUBLICATIONS

New Zealand Examination Report issued Aug. 12, 2014 re: Application No. 627944; citing: GB2467620 and EP1440847.

*Primary Examiner* — Joshua J Michener
*Assistant Examiner* — Devin Barnett
(74) *Attorney, Agent, or Firm* — Cantor Colburn LLP

(57) ABSTRACT

A wall-mounted bicycle rack comprising a rod-like element with a wall fixing plate, inserted in a bicycle supporting arm, in the direction of the length of the latter, the bicycle supporting arm being orientable by rotation about the main axis of the rod-like element, means being further provided for the reversible locking of the angular configuration of the bicycle supporting arm with respect to the rod-like element.

10 Claims, 6 Drawing Sheets

(56) References Cited

U.S. PATENT DOCUMENTS

| | | | | |
|---|---|---|---|---|
| 5,447,241 A | * | 9/1995 | Bureau | 211/18 |
| 5,553,715 A | * | 9/1996 | Brotz | 211/5 |
| 5,573,165 A | * | 11/1996 | Bloemer et al. | 224/523 |
| 5,702,006 A | * | 12/1997 | Durham | 211/18 |
| 5,765,821 A | * | 6/1998 | Janisse et al. | 269/16 |
| 5,802,889 A | * | 9/1998 | Arnold | 70/18 |
| 5,806,187 A | * | 9/1998 | Ducret | 30/92 |
| 5,887,461 A | * | 3/1999 | Heffley | 70/18 |
| 6,082,552 A | * | 7/2000 | Pollock et al. | 211/18 |
| 6,364,124 B1 | * | 4/2002 | Chen | 211/4 |
| 6,843,380 B1 | * | 1/2005 | Fickett | 211/22 |
| 6,983,853 B1 | * | 1/2006 | Fickett | 211/18 |
| 7,543,469 B1 | * | 6/2009 | Tseng et al. | 70/472 |
| 7,766,313 B2 | * | 8/2010 | Panosian | 269/37 |
| 8,528,748 B2 | * | 9/2013 | Shaha et al. | 211/22 |
| 8,820,543 B2 | * | 9/2014 | Huang | 211/18 |
| 8,910,560 B2 | * | 12/2014 | Irwin | 89/37.01 |
| 8,959,965 B2 | * | 2/2015 | Gray | 70/236 |
| 2002/0125388 A1 | * | 9/2002 | Eslick | 248/230.4 |
| 2002/0134742 A1 | * | 9/2002 | Huang | 211/17 |
| 2004/0177660 A1 | * | 9/2004 | Tsai | 70/223 |
| 2004/0217239 A1 | * | 11/2004 | Chuang | 248/125.8 |
| 2006/0180554 A1 | * | 8/2006 | Lang | 211/18 |
| 2006/0249466 A1 | * | 11/2006 | Wang | 211/17 |
| 2008/0011031 A1 | * | 1/2008 | Chuang | 70/233 |
| 2008/0087058 A1 | * | 4/2008 | Chang | 70/233 |
| 2008/0272264 A1 | * | 11/2008 | Carlson et al. | 248/354.4 |
| 2009/0057973 A1 | * | 3/2009 | Henderson | 269/95 |
| 2010/0096347 A1 | * | 4/2010 | Theobald et al. | 211/85.7 |
| 2010/0237213 A1 | * | 9/2010 | Wang | 248/324 |
| 2013/0043198 A1 | * | 2/2013 | Bleazard | 211/19 |

FOREIGN PATENT DOCUMENTS

| | | |
|---|---|---|
| GB | 2467558 A | 8/2010 |
| GB | 2467620 A | 8/2010 |

* cited by examiner

# WALL-MOUNTED BICYCLE RACK

The present invention relates to a wall-mounted bicycle rack.

BACKGROUND OF THE INVENTION

Nowadays wall-mounted supports for bicycles are known, which have a frame that supports hooks on which bicycles are hung, by their wheels or crossbar.

Such structures are fixed and jut out from the wall to which they are fixed, with a beam from which hang the hooks.

Thus, even when no bicycles are hung, such supports take up the space that is given over to them when in use.

In order to meet the need for supports that are less and less cumbersome, nowadays supports are known which are defined by a frame made with a U-shaped metal tubing fixed to a wall, to the lower end of which a fork is pivoted so that it can rotate in order to pass from a configuration in which it is folded on the frame to a configuration that has the arms of the fork substantially perpendicular to the wall to which the support is fixed, to be able to hang the bicycle to be supported on the fork.

This type of support is nowadays provided in models that differ substantially in the shape of the fork, which can be made with a U-shaped metal tubing, so that its arms are integral, or can be made with two independent tubes that are pivoted to the frame.

Such wall-mounted bicycle rack structures, although widespread and appreciated, are however relatively complex in terms of components, and although they can be folded toward the wall, they still result in a certain extent of space occupation.

Therefore, the needs that are most felt nowadays in the field of wall-mounted supports for bicycles, and which are left unmet by the supports known today, are the possibility to have a support that can be adapted to the type of bicycle to be supported, since the wall-mounted bike-rack products currently on the market mainly hold the bike by the crossbar of the frame (top tube) or at the front/rear wheel, and to have a wall-mounted bike-rack that is extremely simple to install and use.

Therefore a bike with no horizontal crossbar cannot be supported by most conventional bike-racks, which are not those with a hook for hanging the bike by a wheel.

SUMMARY OF THE INVENTION

The aim of the present invention is to provide a wall-mounted bicycle rack that is capable of overcoming the above mentioned limitations of conventional wall-mounted bicycle racks.

Within this aim, an object of the invention is to provide a wall-mounted bicycle rack that can be configured rapidly and simply so as to be able to support different types of bike and bikes with different frames.

Another object of the invention is to provide a bicycle rack with a visual impact that is elegant and non-invasive with respect to the environment in which it is installed.

Another object of the invention is to provide a wall-mounted bicycle rack that can be installed and adjusted with conventional tools.

This aim and these and other objects which will become better evident hereinafter are achieved by a wall-mounted bicycle rack, characterized in that it comprises a rod-like element with a wall fixing plate, inserted in a bicycle supporting arm, in the direction of the length of the latter, said bicycle supporting arm being orientable by rotation about the main axis of said rod-like element, means being provided for the reversible locking of the angular configuration of said bicycle supporting arm with respect to said rod-like element.

BRIEF DESCRIPTION OF THE DRAWINGS

Further characteristics and advantages of the invention will become better apparent from the description of a preferred, but not exclusive, embodiment of the wall-mounted bicycle rack according to the invention, which is illustrated by way of non-limiting example in the accompanying drawings wherein.

DESCRIPTION OF THE PREFERRED EMBODIMENTS

Figure 1:
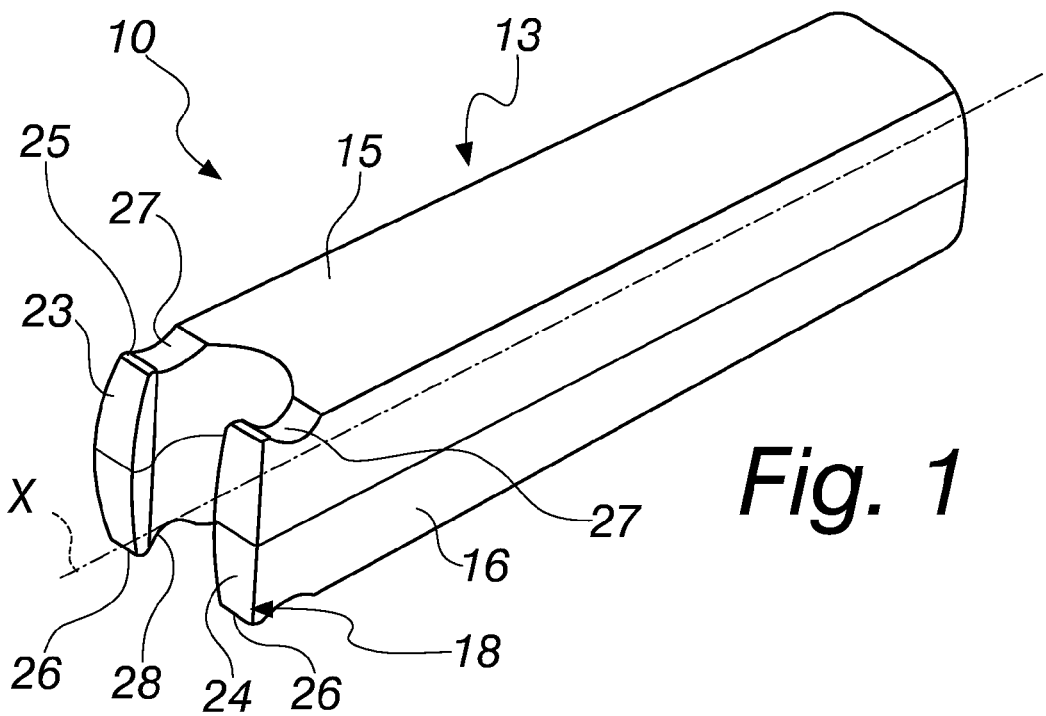
FIG. 1 is a first perspective view of a bicycle rack according to the invention.

With reference to the figures, a wall-mounted bicycle rack according to the invention is generally designated with the reference numeral 10.

Figure 2:
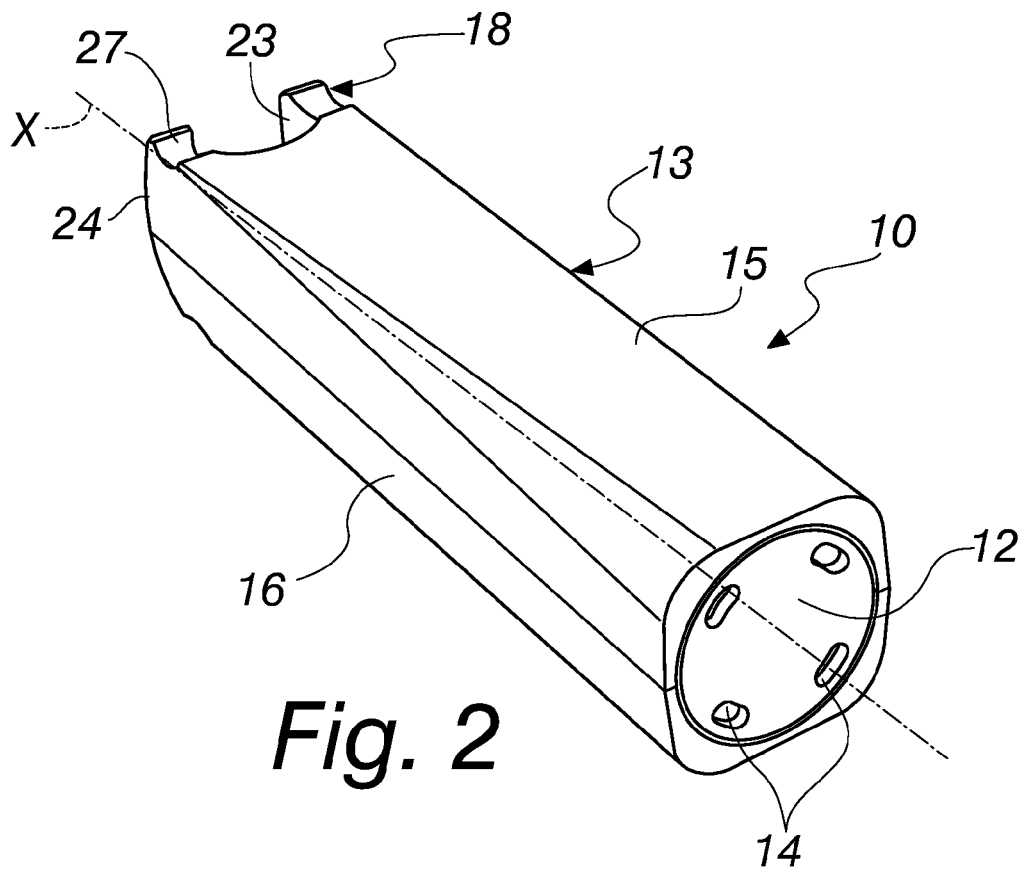
FIG. 2 is a second perspective view of the bicycle rack in FIG. 1.
Figure 3:
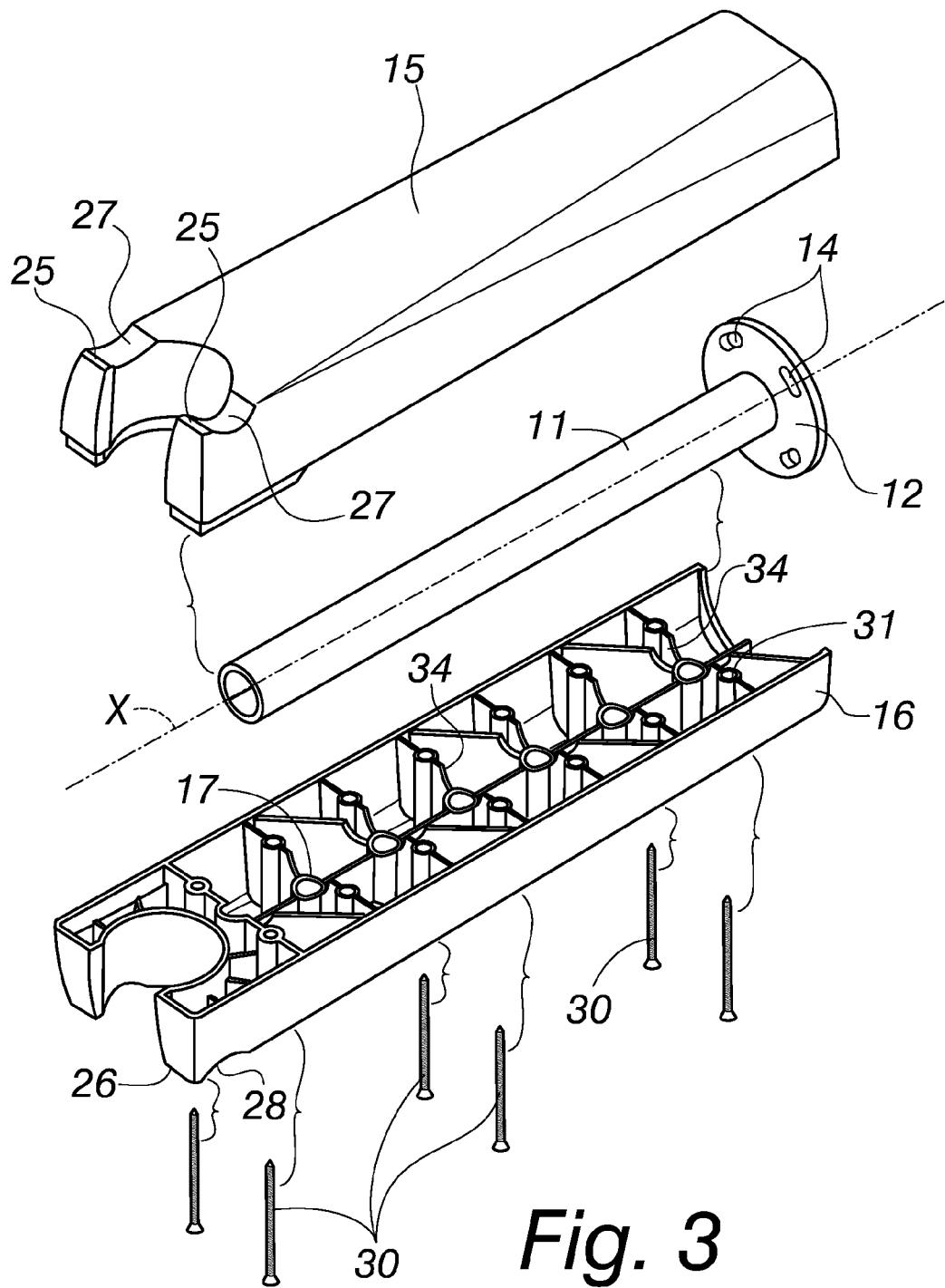
FIG. 3 is an exploded perspective view of the bicycle rack according to the invention.
Figure 4:
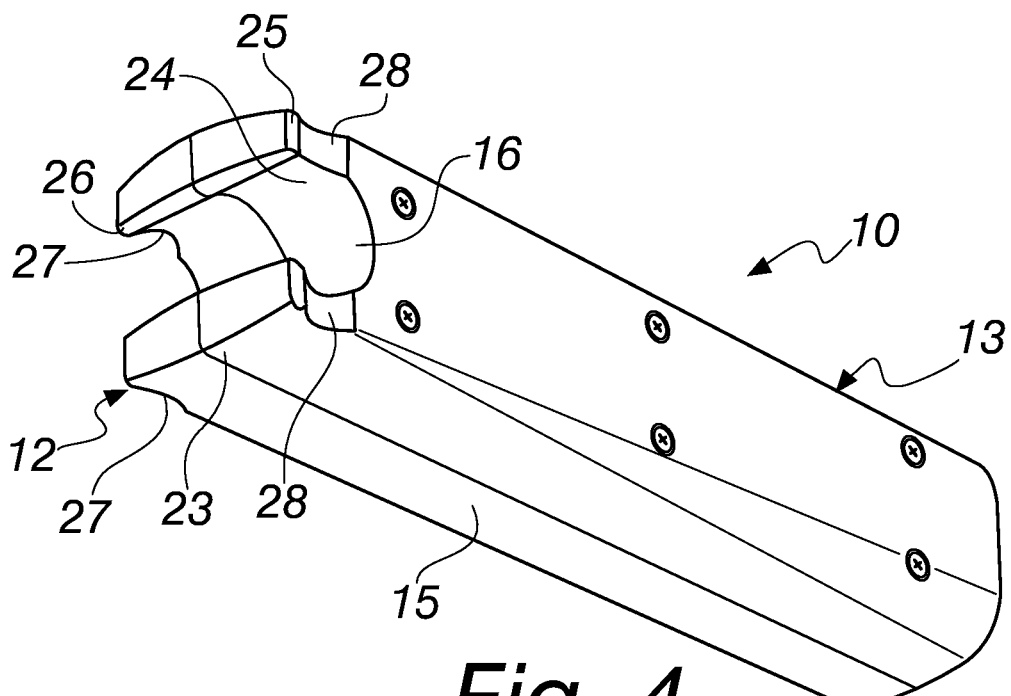
FIG. 4 is a third perspective view of the bicycle rack according to the invention.
Figure 5:
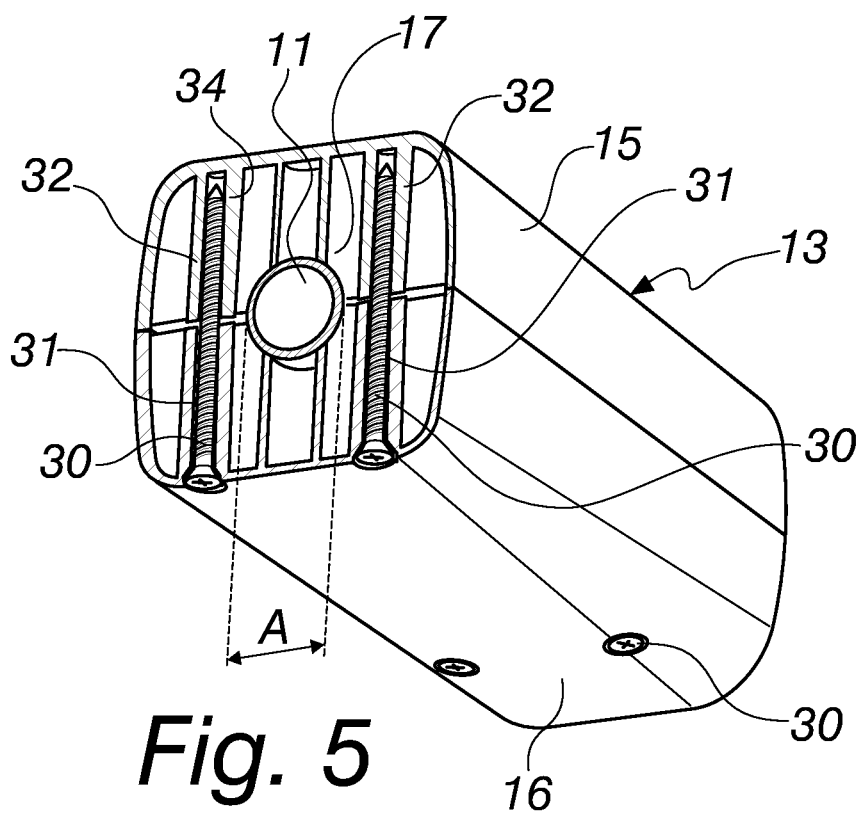
FIG. 5 is a cutaway perspective view of a bicycle rack according to the invention.

The wall-mounted bicycle rack 10 comprises a rod-like element 11, clearly visible in FIG. 3, provided with a wall fixing plate 12, the plate being visible in FIGS. 2 and 3, and inserted in a bicycle supporting arm 13, in the direction of the length of the latter.

The bicycle supporting arm 13 is orientable by rotation about a main axis X of a rod-like element 11, means, described below, being provided for the reversible locking of the angular configuration of the bicycle supporting arm 13 with respect to the rod-like element 11.

The rod-like element 11 is constituted for example by a tube that is circular in cross-section.

The fixing plate 12 is constituted for example by a plate with four slots 14 for corresponding threaded elements for fixing to a wall; obviously at least two threaded elements are used, and there are at least two openings defined on the fixing plate 12.

The bicycle supporting arm 13 is constituted by two half-shells 15 and 16 which, when closed onto each other, define a seat 17 for the rod-like element 11.

The inner perimeter of the transverse cross-section of the seat 17 has a main dimension that is smaller than a corresponding main dimension A of the transverse cross-section of the outer perimeter of the rod-like element 11.

In this manner the closure of the two half-shells 15 and 16 onto each other determines the locking between the two in the seat 17 of the rod-like element 11.

Figure 6:
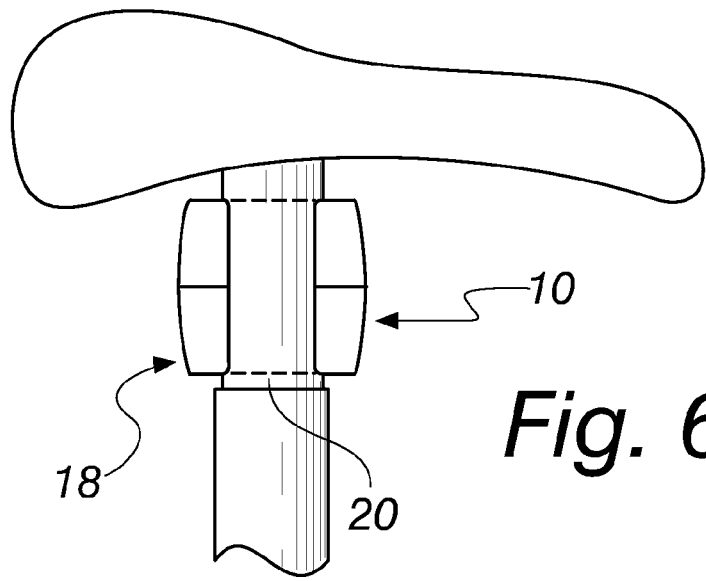
FIGS. 6 to 8 each show a mode of use of the bicycle rack according to the invention.
Figure 7:
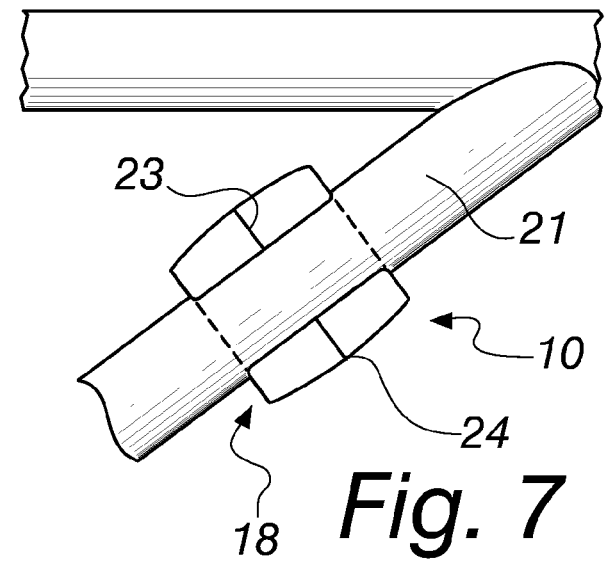
Figure 8:
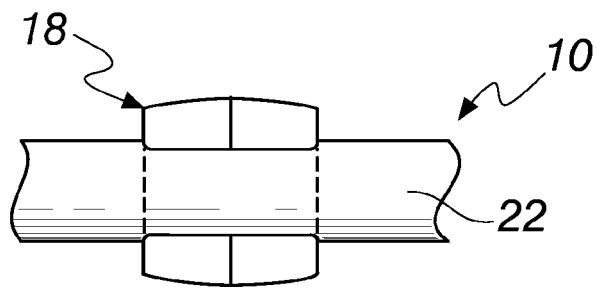

The bicycle supporting arm 13 has the free end 18 shaped like a fork, preset to accommodate a tubular portion of a bicycle frame, such as for example a first portion of a saddle-tube 20 in FIG. 6, or a portion of a diagonal tube 21 in FIG. 7, or a portion of a crossbar 22 in FIG. 8, according to the angular configuration in which the bicycle supporting arm 13 is locked with respect to the rod-like element 11.

The facing tabs 23 and 24 that define the fork-like free end 18 have, on their respective upper edge 25 and lower edge 26, a corresponding number of resting recesses 27 and 28 for a tubular portion of a bicycle frame.

The half-shells 15 and 16 with which the bicycle supporting arm is constituted are made of plastic material.

The means for reversible locking of the angular configuration of the bicycle supporting arm 13 with respect to the rod-like element 11, and thus the means for fastening the two half-shells 15 and 16, are constituted by screws 30 that are adapted to be screwed in corresponding holes for example 31 on the second half-shell 16, and holes 32 on the first half-shell 15.

The holes 31 and 32 are defined on stiffening ribs 34 that are defined inside the half-shells 15 and 16.

In an alternative and equivalent embodiment, not shown for simplicity, the bicycle supporting arm is provided in one piece instead of being comprised of two half-shells, and has a central hole for accommodating the rod-like element and a radial threaded hole for a locking grub screw that is adapted to be screwed radially until it encounters the rod-like element and bites into it.

Use of the wall-mounted bicycle rack 10 according to the invention is the following.

The plate 12 welded to the rod-like element 11 is fixed to the wall, the half-shells 15 and 16 are arranged to surround the rod-like element 11, the half-shells are rotated around the rod-like element, positioning them angularly in the selected configuration, and in that position they are closed onto each other by way of screwing the screws 30 into the corresponding holes.

Thus the bicycle supporting arm 13 is defined, rotated in the preferred functional configuration.

Figure 9:
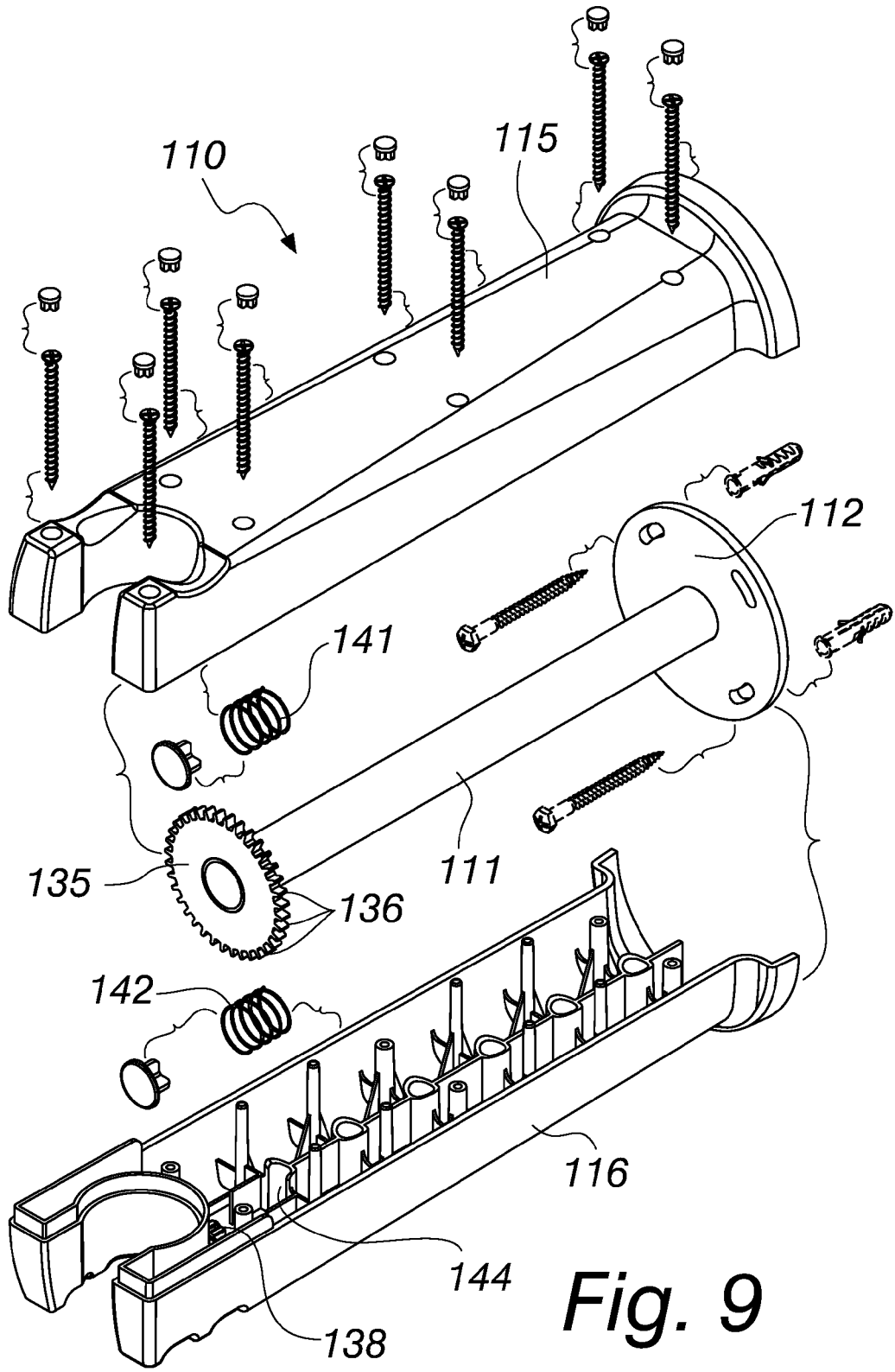
FIG. 9 is an exploded perspective view of a bicycle rack according to the invention in a variation of embodiment thereof.

A variation of embodiment of the bicycle rack according to the invention, designated in FIG. 9 with the reference numeral 110, comprises, similarly to what is described above, a rod-like element 111 provided with a wall fixing plate 112, and inserted in a bicycle supporting arm 113, in the direction of the length of the latter.

The bicycle supporting arm 113 is orientable by rotation about the main axis X of the rod-like element 111, means being provided for the reversible locking of the angular configuration of the bicycle supporting arm 113 with respect to the rod-like element 111.

In the present variation of embodiment, the means for the reversible locking of the angular configuration of the bicycle supporting arm 113 with respect to the rod-like element 111 comprise, in addition to the means for fastening the two half-shells 115 and 116 as described above, an anti-rotation element 135 that is fixed to the rod-like element 111 and is provided with raised engagement portions 136 with corresponding recesses 137 that are defined on at least one corresponding anti-rotation portion 138 that is integral with one or with both of the half-shells 115 and 116.

Figure 10:
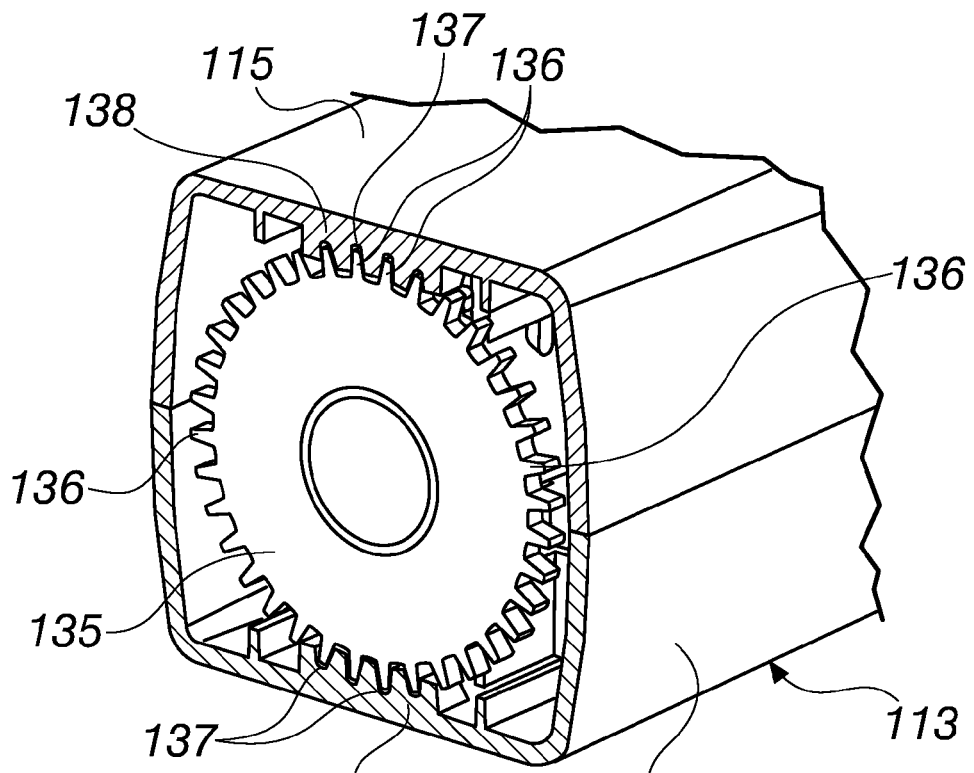
FIG. 10 is a cutaway perspective view of the variation in FIG. 9, assembled.
Figure 11:
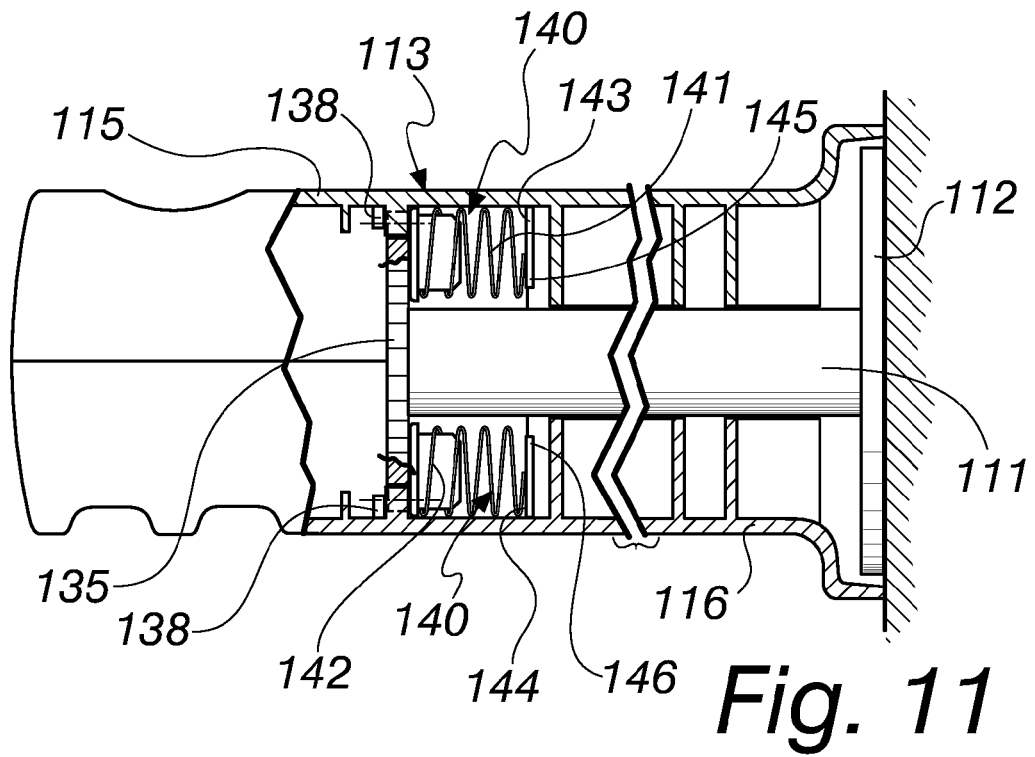
FIG. 11 is a longitudinal sectional side view of the variation of the invention shown also in FIGS. 9 and 10.

In the present embodiment, the anti-rotation element 135 is constituted by a toothed wheel, whose teeth define the raised engagement portions 136, while the recesses 137 and the anti-rotation portion 138 are constituted by two mutually opposite toothed portions for meshing with the toothed wheel, each one defined within a respective half-shell 115 and 116 and in one piece therewith, as can clearly be seen in FIG. 10.

The engagement between the teeth of the toothed wheel and the anti-rotation portions 138 determine and ensure the stability of the angular position of the bicycle rack 110 according to the invention.

For convenience of use, the half-shells 115 and 116 when closed onto each other around the rod-like element 111 so as to define the bicycle supporting arm 113, with the anti-rotation element 135 engaged in the anti-rotation portions 138, can move translationally in an axial direction in order to disengage the anti-rotation element 135 from the anti-rotation portions 138.

In this manner, by translationally moving the half-shells 115 and 116 axially, the disengagement is obtained of the anti-rotation element 135 from the anti-rotation portions 138, and hence the possibility to modify the inclination of the bicycle supporting arm 113 by rotating the bicycle supporting arm about its own axis.

By re-establishing the axial position of engagement of the anti-rotation element 135 with the anti-rotation portions 138, the positional stability of the arm 113 is restored.

There are, in such variation of embodiment, elastic means 140 for the automatic restoration of the position of the bicycle supporting arm 113 with respect to the rod-like element 111 in which the anti-rotation element 135 is engaged with the anti-rotation portions 138.

The elastic means 140, for the automatic restoration of the position of the bicycle supporting arm 113 with respect to the rod-like element 111, comprise, in the present embodiment, two helical pusher springs 141 and 142 respectively, which are arranged in diametrically opposite positions with respect to the axis of the rod-like element 111, each one recessed in a corresponding niche 143 and 144 that is defined within the half-shells 115 and 116 of the bicycle supporting arm 113.

Each helical pusher spring 141 and 142 is interposed between a supporting wall 145 and 146 of the respective niche 143 and 144 and the anti-rotation element 135, i.e. the toothed wheel.

In order to modify the angular position of the bicycle supporting arm 113 with respect to the rod-like element 111 it is necessary and sufficient to pull, in an axial direction, the bicycle supporting arm 113 away from the wall to which the rod-like element 111 is fixed by way of the plate 112, rotate the bicycle supporting arm 113 through the desired angle until the new position is defined, release or return the bicycle supporting arm 113 which, pushed by the helical pusher springs 141 and 142, moves toward the wall, correcting the position as necessary so as to obtain the correct engagement of the raised engagement portions 136 of the anti-rotation element 135 with the recesses 137 of the anti-rotation portions 138.

In practice it has been found that the invention fully achieves the intended aim and objects.

In particular, with the invention, a wall-mounted bicycle rack has been devised which can be configured rapidly and simply so as to be able to support different types of bike and bikes with different frames, and always in the preferred arrangement, i.e. substantially parallel with the ground.

Moreover, with the invention a bicycle rack has been made available with a visual impact that is elegant and non-invasive with respect to the environment in which it is installed.

Furthermore, with the invention a wall-mounted bicycle rack has been devised that can be installed and adjusted with conventional tools.

The invention, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. BO2013A000421 from which this application claims priority are incorporated herein by reference.

What is claimed is:

1. A wall-mounted bicycle rack, comprising a rod element with a wall fixing plate, wherein the wall fixing plate is adapted to mount the bicycle rack to a wall, the rod element being inserted in an elongated bicycle supporting arm along a generally central axis of the bicycle supporting arm, said bicycle supporting arm has a free end shaped like a fork to grip a tubular portion of a bicycle frame, wherein said bicycle supporting arm is rotatable about a central axis of said rod element to adjust the angular orientation of the bicycle supporting arm with respect to the wall in order to grip different portions of the bicycle frame at different angles; and means being provided for the reversible locking of the angular orientation of said bicycle supporting arm with respect to said rod element comprising an anti-rotation toothed wheel that is fixed to the rod element and is provided with teeth for engagement with corresponding recesses that are defined within the bicycle supporting arm.

2. The bicycle rack according to claim 1, wherein said bicycle supporting arm is constituted by two half-shells, which, when closed onto each other, define a seat for said rod element, wherein an inner perimeter of a transverse cross-section of said seat has a dimension that is smaller than a corresponding dimension of a transverse cross-section of an outer perimeter of said rod element.

3. The bicycle rack according to claim 2, wherein said means for the reversible locking of the angular configuration of said bicycle supporting arm with respect to said rod element includes screws adapted to be screwed in corresponding holes on a second half-shell of said two half-shells and holes on a first half-shell of said two half-shells for fastening the two half-shells.

4. The bicycle rack according to claim 1, wherein facing tabs that define said fork shaped free end have, on their respective upper edge and lower edge, a corresponding number of resting recesses for accommodating a tubular portion of a bicycle frame.

5. The bicycle rack according to claim 2, wherein said half-shells that constitute the bicycle supporting arm are each made of a plastic material.

6. The bicycle rack according to claim 2, wherein the corresponding recesses are defined on at least one corresponding anti-rotation portion that is integral with one or with both interior surfaces of the half-shells.

7. The bicycle rack according to claim 2, wherein the recesses and the anti-rotation portion are constituted by two mutually opposite toothed portions for meshing with the toothed wheel, each of the respective toothed portions are defined within a respective half-shell.

8. The bicycle rack according to claim 6, wherein said half-shells when closed onto each other around the rod element to define the bicycle supporting arm, with the anti-rotation toothed wheel engaged with the anti-rotation portions, can move translationally in an axial direction in order to disengage said anti-rotation toothed wheel from the anti-rotation portions.

9. The bicycle rack according to claim 6, further comprising an elastic means to automatically restore an original or resting angular position of the bicycle supporting arm with respect to the rod element in which the anti-rotation toothed wheel is engaged with the anti-rotation portions.

10. The bicycle rack according to claim 9, wherein said elastic means comprises helical pusher springs that are arranged in diametrically opposite positions with respect to the central axis of the rod element, each helical pusher spring being recessed in a corresponding niche that is defined within the half-shells of the bicycle supporting arm.

* * * * *